United States Patent [19]
Nagao

[11] Patent Number: 6,122,401
[45] Date of Patent: Sep. 19, 2000

[54] IMAGE PROCESSING METHOD AND APPARATUS

[75] Inventor: Kagenori Nagao, Kanagawa, Japan

[73] Assignee: Eastman Kodak Company, Rochester, N.Y.

[21] Appl. No.: 07/828,092

[22] Filed: Jan. 30, 1992

[30] Foreign Application Priority Data

Mar. 19, 1991 [JP] Japan ................................ 3-055059

[51] Int. Cl.[7] ...................................................... G06K 9/00
[52] U.S. Cl. ............................................................ 382/216
[58] Field of Search ............................... 382/30, 48, 14, 382/33, 34, 27, 18

[56] References Cited

U.S. PATENT DOCUMENTS

| | | | |
|---|---|---|---|
| 4,550,437 | 10/1985 | Kobayashi et al. | 382/27 |
| 4,589,140 | 5/1986 | Bishop et al. | 382/27 |
| 4,745,633 | 5/1988 | Waksman et al. | 382/42 |
| 4,748,679 | 5/1988 | Gold et al. | 382/61 |
| 4,805,225 | 2/1989 | Clark | 382/15 |

*Primary Examiner*—Christopher S. Kelley
*Attorney, Agent, or Firm*—Raymond L. Owens

[57] ABSTRACT

An image processing method and apparatus in the form of a sampling mask that enables slight image variations to be absorbed and improves the accuracy of image matching based on a comparison of characteristic quantities such as by the template matching method. A multi-dimensional image is divided into regions that overlap each other. The pixels in each of the regions are weighted in accordance with a predetermined function whereby the weighting is largest at the center of a region and decreases as the distance from the center increases. The characteristic sums of the weighted pixel values are extracted as the mask output for absorbing local image variation.

26 Claims, 8 Drawing Sheets

IMAGE PROCESSING METHOD AND APPARATUS

FIELD OF THE INVENTION

The present invention relates to a method and apparatus for processing images, and more particularly, to an image processing method and apparatus that can improve image recognition rates when applied to character and figure recognition.

BACKGROUND OF THE INVENTION

Template matching is one of the image identification methods that is extensively used in character and figure recognition because of its simplicity and flexibility. In template matching, the cross-correlation between an input image and a reference image is calculated to form a matching score. A high matching score is taken to indicate a high correlation. However, a problem of this method is that the matching score can be drastically decreased if an image has undergone even a slight shift in position or angle relative to the reference image, markedly reducing the recognition rate.

FIG. 1 illustrates the use of template matching of an input image 11 and reference image 13, each being a horizontal line. The figure shows that the position of the horizontal line in input bit-mapped image 11 differs from that of the reference bit-mapped image 13 by one bit in the vertical plane, but at a glance they appear similar. However, in this case, template matching produces a matching score of 0.0. This makes it difficult to apply template matching to the recognition of handwritten characters and figures, which constantly undergo slight changes.

One technique designed to provide some improvement is the mesh characteristic method of processing input and reference images, a method that predates the template matching method. In the mesh characteristic method, as illustrated by FIG. 2, an input or reference bit-mapped image 15 is divided into a number of small regions and the sum of the values of all pixels or image elements within each region is calculated to produce the mesh pattern 17 of the bit-mapped image 15. This enables small variations to be absorbed.

With reference to FIG. 3, if the mesh characteristic method is used to obtain mesh patterns 15 and 18 based on characteristic quantities of the input bit-mapped image 11 and reference bit-mapped image 13 respectively, and then template matching is applied to the mesh patterns 15 and 18, rather than to the image itself, it is possible to obtain a high matching score even if there are minor variations between input and reference images. Thus, although the matching score of the bit-mapped images 11 and 13 is 0.0, with mesh patterns 15 and 18 a matching score of 1.0 is obtained. This means that mesh patterns obtained by the mesh characteristic method can absorb variation as long as such variation is limited to a small region.

Thus, with the above conventional image processing methods, image matching scores can be improved by absorbing small image variations, but at the same time this gives rise to the following problems.

The mesh characteristic method only absorbs image variations that take place within a small region. Therefore, with reference to the type of situation depicted in FIG. 4 where the discrepancy between the input bit-mapped image 11 and the reference bit-mapped image 19 is spread over two regions, there will also be a discrepancy between the corresponding mesh patterns 15 and 21, resulting in a matching score of 0.0, meaning that discrepancy has not been absorbed.

Also, the method only calculates the sum of the pixel values within each small region, so small differences are not reflected by the output. Hence, even when there is a difference between an input image and an output image, the two images may be processed as being the same. One possible remedy is to increase the number of regions by decreasing the size of the regions of the mesh, but doing this decreases the ability to absorb image variation.

Thus, with respect to absorbing image variation as a prerequisite to image matching with the conventional image processing methods, a major task concerns achieving a performance whereby images that appear similar are output as similar, images that are identical are output as identical, and images that are slightly different are output as slightly different.

SUMMARY OF THE INVENTION

An object of the present invention is therefore to provide an image processing method and apparatus in the form of a sampling mask that enables slight image variations to be absorbed and improves the accuracy of image matching based on a comparison of characteristic quantities by the template matching method.

In accordance with the present invention, this and other objects are attained by dividing or partitioning the whole of a multi-dimensional image into weighted multi-dimensional regions that overlap each other, weighting the pixels or image elements in each of the regions in accordance with a predetermined function whereby the weighting is largest at the center of a region and decreases as the distance from the center increases, and extracting the characteristic sums of the weighted pixel or image element values as the mask or characteristic output for absorbing local image variation.

Further features of the invention, its nature and various advantages, will become more apparent from the accompanying drawings and following detailed description of the invention.

DETAILED DESCRIPTION OF THE PREFERRED EMBODIMENTS

Figure 5:
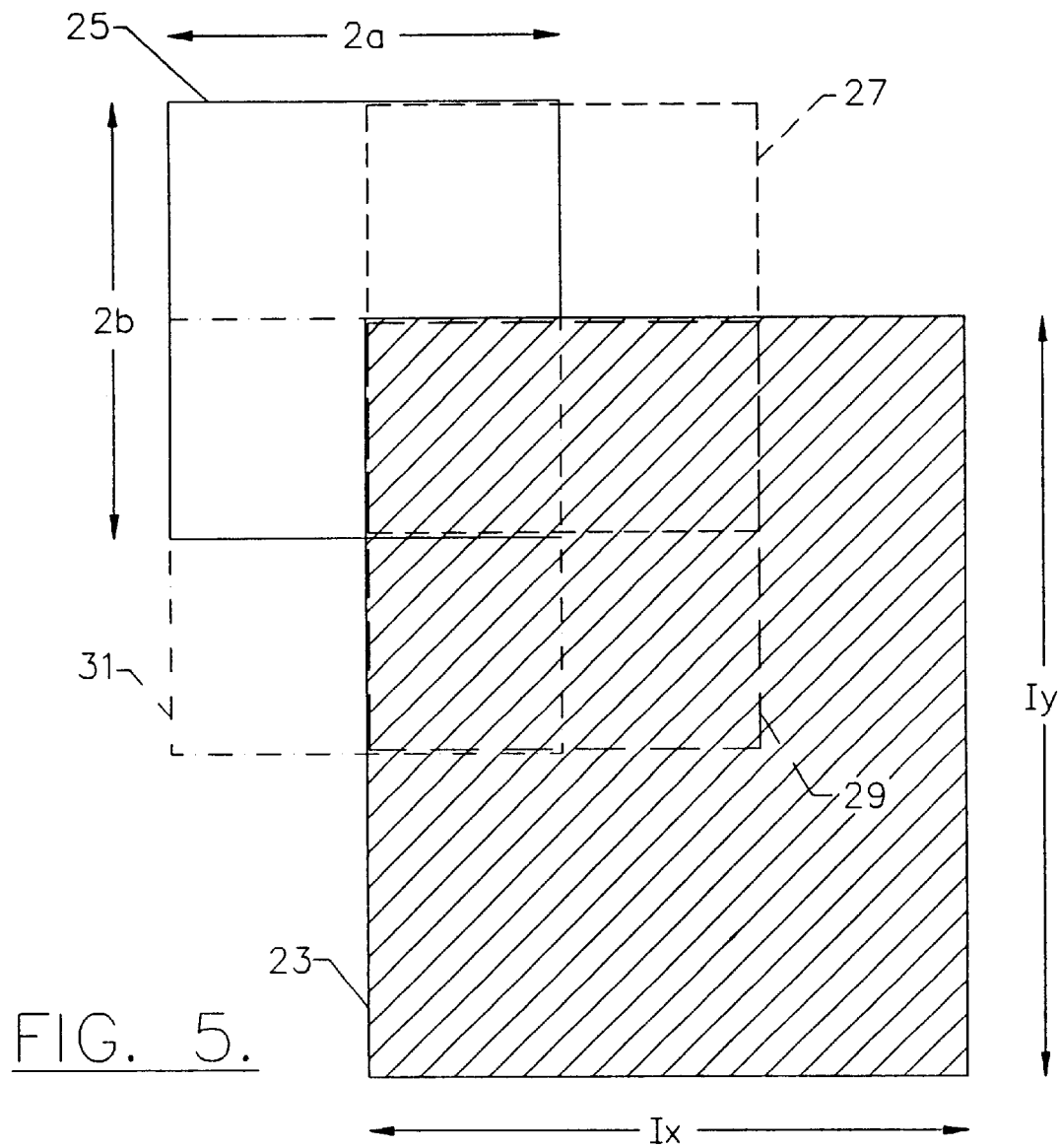
FIG. 5 is an explanatory drawing relating to an image processing method according to the present invention.

FIG. 5 illustrates an embodiment of the image processing method of the invention; more specifically, it shows an example of the use of a sub-sampling mask for absorbing variation in a two-dimensional image. With reference to the drawing, an image 23 measuring Ix by Iy is divided or partitioned into a plurality of overlapping rectangular regions. In FIG. 5, only four representative rectangular regions, which are the 1st small region 25, 2nd small region 27, 3rd small region 29 and 4th small region 31, are shown. Each of these small regions 25 to 31 corresponds to a mask.

Here only four regions are shown, but in practice an image is divided up into a large number of these small regions. In this case there are Nx times Ny small regions where Nx represents the number of columns of small regions along the x-axis of the image and Ny represents the number of rows of small regions along the y-axis of the image. Each of these small regions has a weighting that is largest at the center of the region and decreases as the distance from the center increases. The weighted sum of the pixels or image elements within a region forms the mask or characteristics output of that region.

The coordinates of the upper left corner of FIG. 5 are (0, 0) and the small regions are arranged so that the center of each is (Xi, Yj). However, Xi=Ix/(Nx−1)·i; i=0, 1, 2, . . . , Nx−1, Yj=Iy/(Ny−1)·j; j=0, 1, 2, . . . , Ny−1. In this case, the output L(Xi, Yj) from one small region is:

$$L(Xi, Yj) = \sum_{I} W(Xi - x, Yj - y) \cdot P(x, y). \quad (1)$$

Where I denotes the extent of the image:

$$I = \{(x, y) | 0 \leq x < Ix, 0 \leq y < Iy\} \quad (2)$$

and P(x, y) indicates the value of a pixel located at (x, y). W(Xi−x, Yj−y) is the weighting function at location (x, y) of a small region with its center located at (Xi, Yj). The weighting is arranged so that weights are largest at the center and decrease as the distance from the center increases. Equation (3) shows an example of a weighting function for this purpose.

$$W(Xi - x, Yj - y) = \begin{cases} 1 - \max(|Xi - x|/a, |Yj - y|/b) \\ \text{when } \max(|Xi - x|/a, |Yj - y|/b) < 1 \\ 0; \text{otherwise} \end{cases} \quad (3)$$

Here, max(n, m) shows the larger of n and m, and |·| represents an absolute value. Also, a and b are half the length of small region sides x and y respectively, thus:

$$a = Ix/(Nx-1) \quad b = Iy/(Ny-1) \quad (4)$$

The weighting function is not limited to that of Equation (3). Any other function may be applied that is largest at the center of a region and decreases as the distance from the center increases.

The above example may be readily extended to provide a local variation absorbing mask for n-dimensional images. Equations (5) to (8) are Equations (1) to (4) modified for a three-dimensional image, for example.

$$L(Xi, Yj, Zk) = \sum_{I} W(Xi - x, Yj - y, Zk - z) \cdot P(x, y, z) \quad (5)$$

$$I = \{(x, y, z) | 0 \leq x < Ix, 0 \leq y < Iy, 0 \leq z < Iz\} \quad (6)$$

$$W(Xi - x, Yj - y, Zk - z) = \quad (7)$$
$$\begin{cases} 1 - \max(|Xi - x|/a, |Yj - y|/b, |Zk - z|/c) \\ \text{when } \max(|Xi - x|/a, |Yj - y|/b, |Zk - z|/c) < 1 \\ 0; \text{otherwise} \end{cases}$$

$$a = Ix/(Nx-1) \quad b = Iy/(Ny-1) \quad c = Iz/(Nz-1) \quad (8)$$

The improvements to the conventional mesh characteristic method provided by the local variation absorbing mask of the invention will now be described. As the weights at the edges of the small regions are very small, even an image variation that extends across two regions has little effect on the overall output. At portions where such regions are adjacent, the large weights of the other overlapping regions prevent that image portion from being disregarded, thereby ensuring stable absorption over the whole image area.

In accordance with this embodiment of the invention, the weighting corresponds to the location within a region, therefore, small image variations within a region show up as small differences in the output value of the region. This prevents small differences between images from being ignored, thereby enabling small differences to be distinguished while still absorbing image variations.

Figure 1:
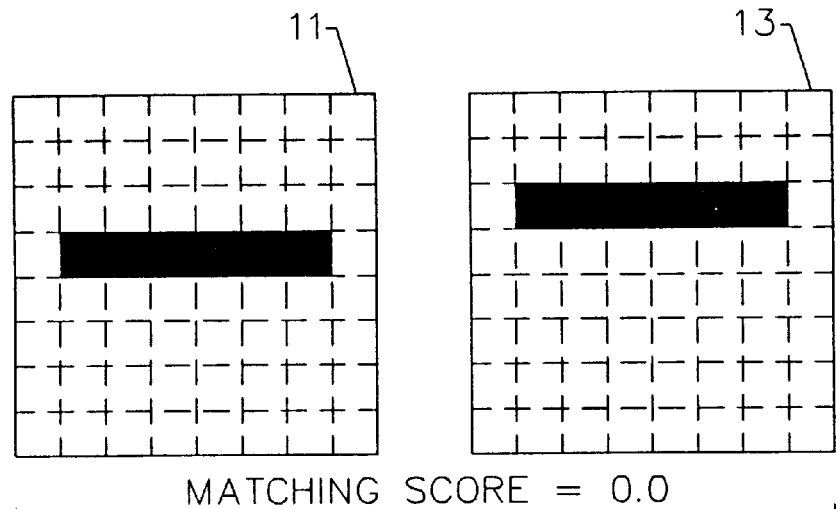
FIG. 1 is an explanatory drawing showing an example of template matching to match horizontal-line input and reference images as known in the prior art.
Figure 2:
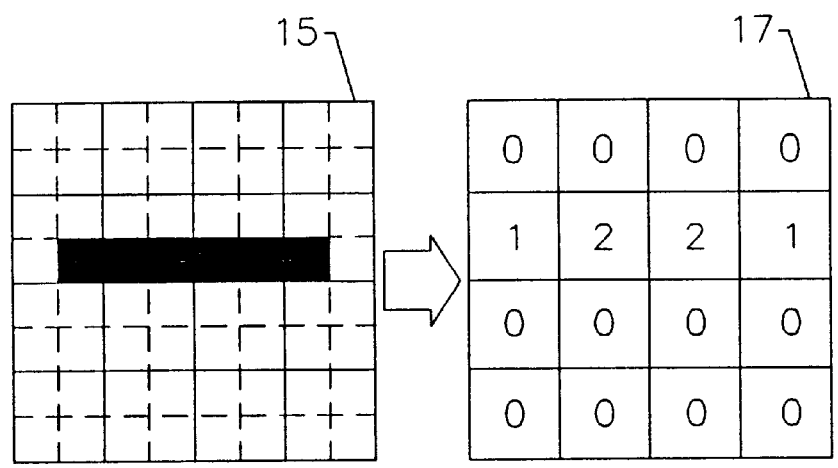
FIG. 2 is an explanatory drawing showing an example of the mesh characteristic method applied to a horizontal-line image as known in the prior art.
Figure 3:
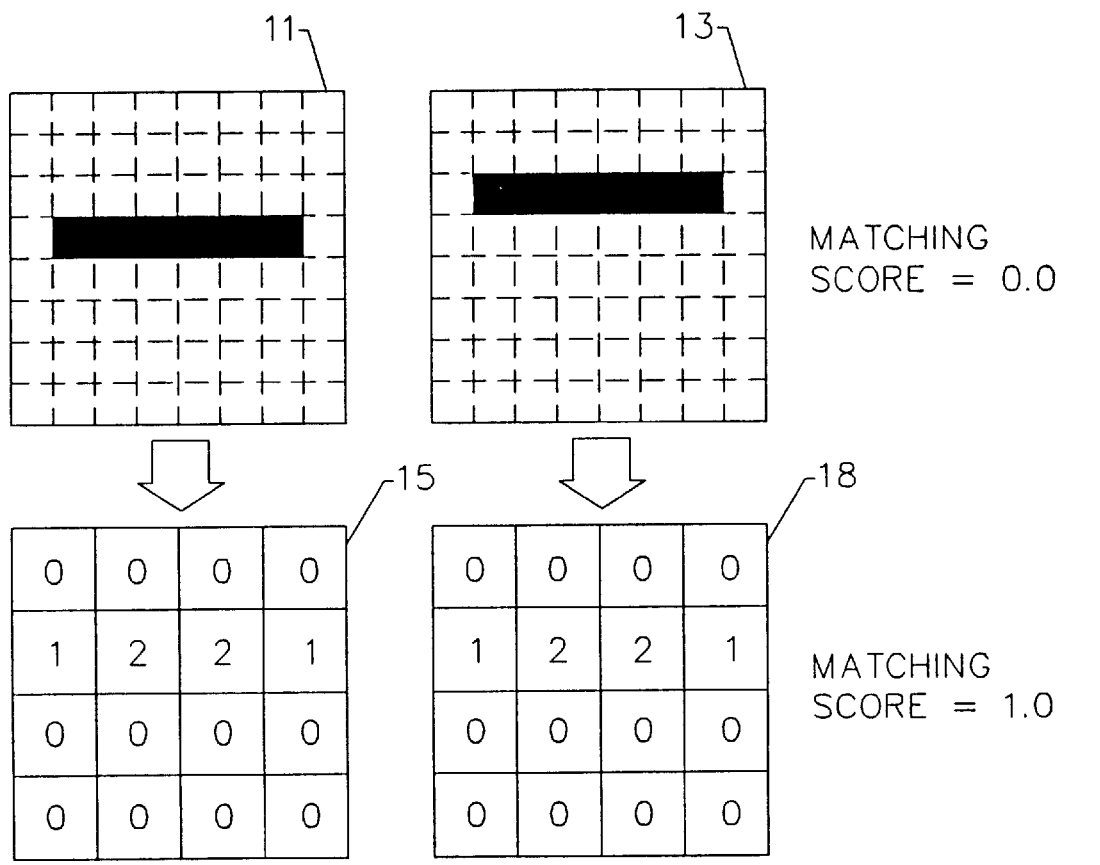
FIG. 3 is an explanatory drawing of the image matching based on mesh patterns obtained by the mesh characteristic method to match horizontal-line input and reference images as known in the prior art.
Figure 6:
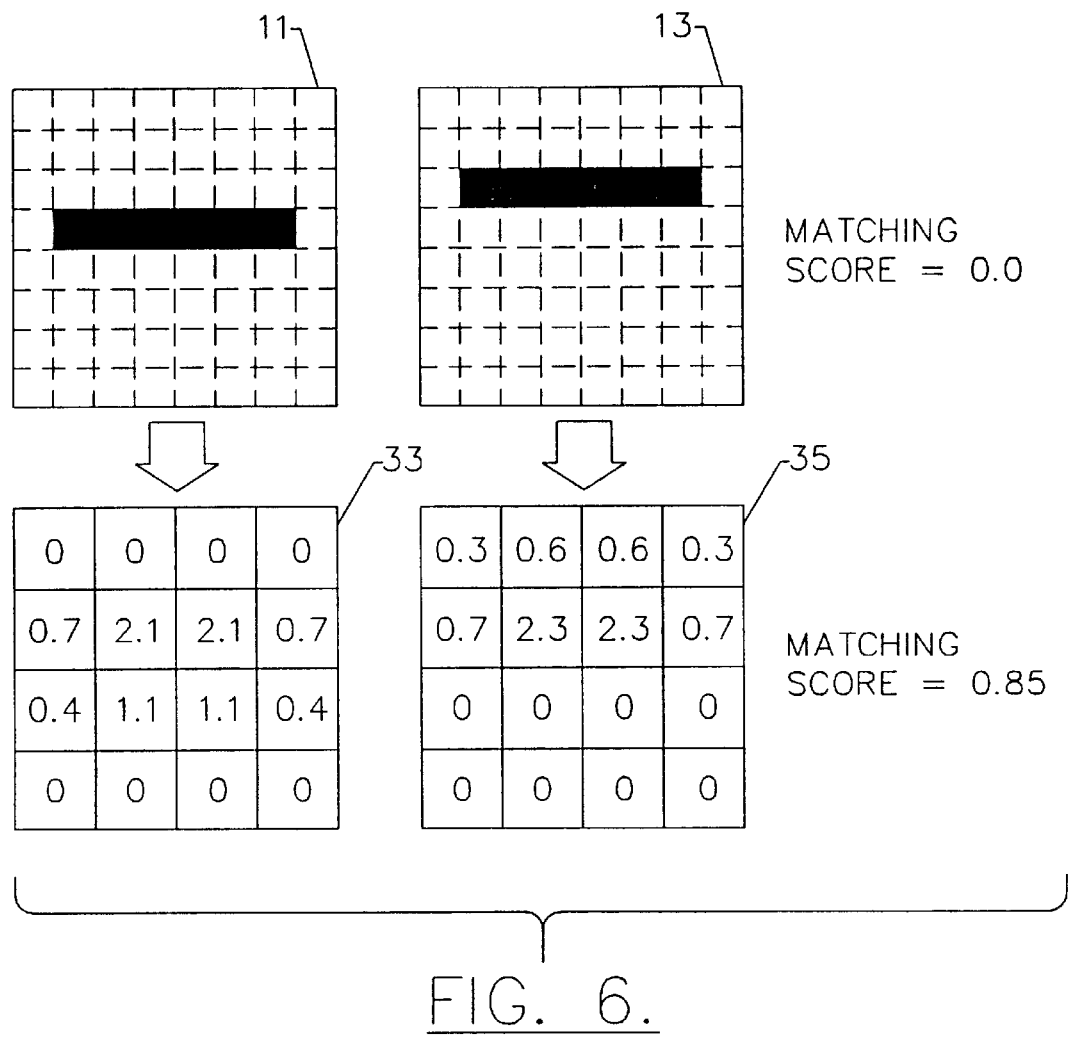
FIG. 6 is an explanatory drawing relating to the application of the present invention to a pair of similar images that received a high matching score using the mesh characteristic method as shown in FIG. 3.

FIG. 6 is an explanatory drawing illustrating the application of the present invention to a pair of similar images that received a high matching score with the mesh characteristic method as shown in FIG. 3. Based on the comparison of the input bit-mapped image 11 and the reference bit-mapped image 13, the images were given a matching score of 0.0. However, when the images 11 and 13 were first converted to weighted patterns 33 and 35 in accordance with this invention and then compared by the template matching technique, the result was a matching score of 0.85. In addition to image variation being absorbed in the same way as with the mesh characteristic method and a high matching score obtained, the matching score is an ideal one that expresses even small image variations.

Figure 4:
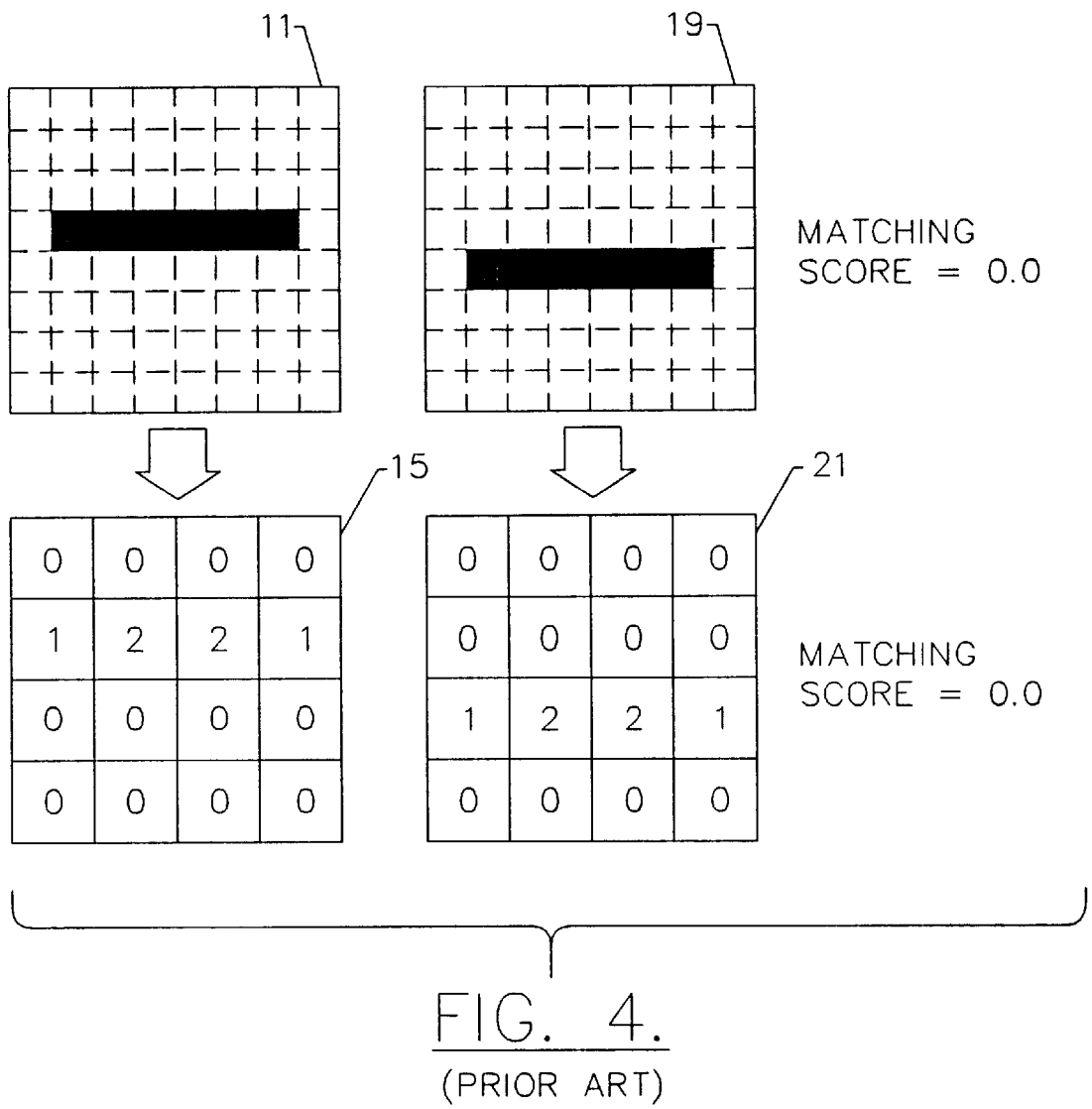
FIG. 4 is an explanatory drawing showing another example of image matching based on mesh patterns obtained by the mesh characteristic method as known in the prior art.
Figure 7:
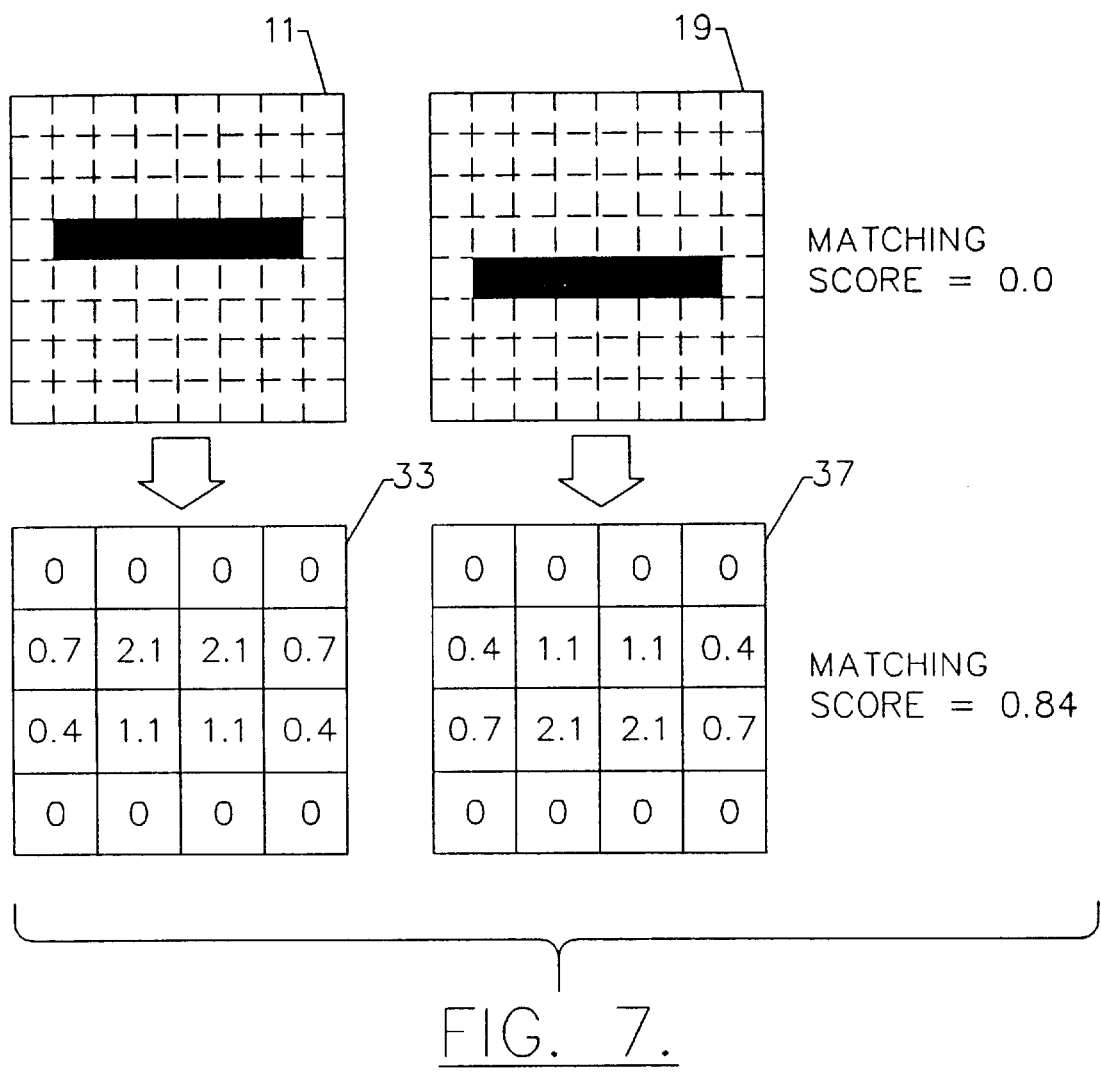
FIG. 7 is an explanatory drawing relating to the application of the present invention to a pair of similar images that did not receive a high matching score using the mesh characteristic method as shown in FIG. 4.

FIG. 7 relates to the application of the present invention to a pair of similar images that did not receive a high matching score with the mesh characteristic method as shown in FIG. 4. Based on the comparison using the mesh characteristic method, the input bit-mapped image 11 and the reference bit-mapped image 19 were given a matching score of 0.0. However, when the images 11 and 19 were first converted to weighted patterns 33 and 37, in accordance with this invention, and then compared by the template matching technique, the result was a matching score of 0.84. Here again, the result was a high matching score that expresses small image variations, and the score was virtually the same in both examples, showing that the output is stable regardless of the image location.

Figure 8:
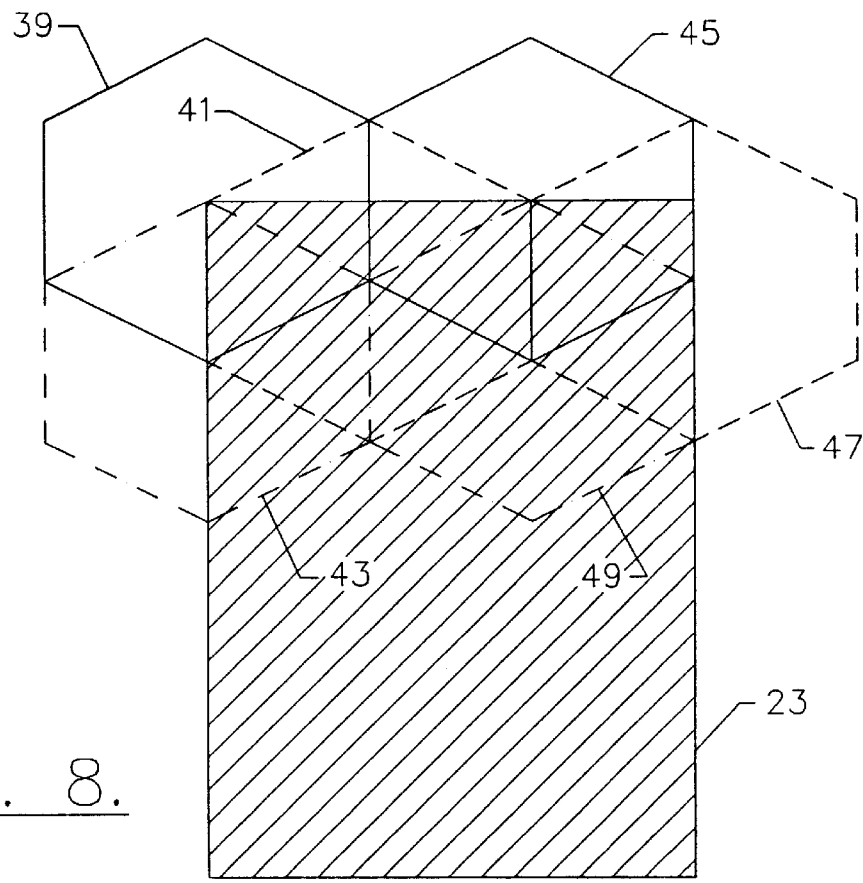
FIG. 8 is an explanatory drawing of an example in which the small regions are hexagons.

Although the above embodiment has been described with reference to the division of an image into small rectangular images, it is not limited to that shape. FIG. 8 shows an example in which the small regions are hexagonal. The image 23 is divided into representative 1st to 4th small regions 39 to 45, a 5th small region 47 and a 6th small region 49. While only six representative regions are shown in FIG. 8, as was discussed previously, in practice an image is divided up into a large number of these small regions. Each of these small regions has a weighting that is largest at the center of the region and decreases as the distance from the center increases. As in the case of the embodiment described above, this provides a matching score that indicates any small image variations. The effect of using hexagonal regions, compared to rectangles, is that the same image area can be represented by fewer sampling points.

Figure 9:
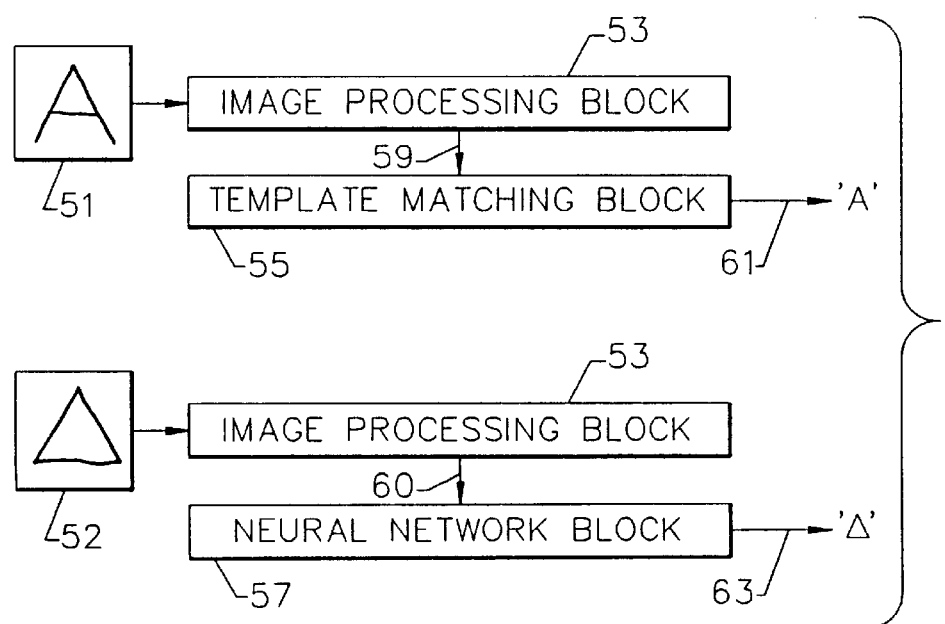
FIG. 9 is an explanatory drawing showing the application of the image processing method and apparatus of the invention to the recognition of handwritten characters and figures.

FIG. 9 shows an example of applying the invention to the recognition of handwritten characters and figures, using template matching or a neural network, respectively. The bit-map data of an input image 51, a handwritten "A", is sampled by image processing block 53, using a local variation absorbing mask. The vector formed by the mask outputs is sent to a template matching block 55 as extracted characteristic vector or output 59 obtained from the input image 51. Based on a high matching score, a recognition outcome is obtained in the form of a definitive output 61. The bit-map data of the input image 52, a triangle figure drawn by hand, also is sampled by image processing block 53, using a local variation absorbing mask, but in this case the vector of the mask outputs is sent to a neural network block 57 as extracted characteristic vector 60 obtained from the input image 16. Based on a high matching score from the matching process, a recognition outcome is obtained in the form of a definitive output 63. If three-dimensional data on an object can be obtained, identification of three-dimensional solids having some variations in shape can also be performed by dividing the object into small regions and absorbing local variations using the present invention.

When performing recognition of figures or characters, taking into consideration unique pixel quantities, such as the curvature and tangent angle at that point, rather than just pixel location and intensity, can raise recognition accuracy. In such cases, by expressing a pixel by multi-dimensional vectors using location, intensity and other characteristic quantities, all pixels can be mapped in multi-dimensional vector space. By dividing this multi-dimensional vector space into multi-dimensional regions to absorb local variations, a high level of recognition becomes possible that takes into account variations in the various characteristic quantities.

Figure 10:
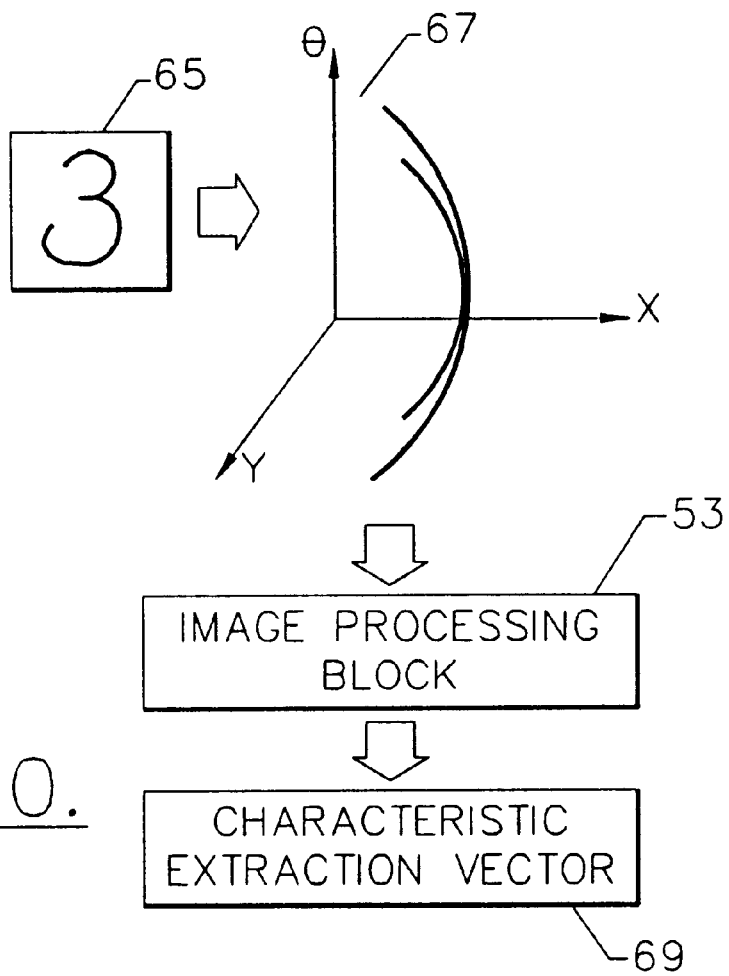
FIG. 10 is an explanatory drawing showing an example of the image processing method and apparatus of the invention in which the tangential angle of each pixel location is processed as a third dimension.

FIG. 10 shows an example in which the tangential angle at each pixel location is processed as a third dimension. In this case, an angle (Θ) is added to the pixel location (x, y), giving (x, y, Θ) which is mapped in three-dimensional characteristic space 67. The addition of local variation absorption processing by the image processing block 53, using a three-dimensional polyhedron mask provides a good characteristic extraction vector 69 in which even changes in tangent slope are absorbed. Below are the results of an experiment relating to the matching score of a pair of similar images derived using the mesh characteristic method and calculated from characteristic quantities using the local variation absorbing mask method of the present invention. Each image was a horizontal line eight pixels long and the overall size of the image was twelve by twelve pixels. With each method, 4 by 4 for a total of 16 masks were used. Eleven pairs of images were prepared, the vertical line location in each case differing by one pixel. The matching scores obtained using these conditions are listed below in Table 1.

TABLE 1

| Method | Average matching score | Standard deviation |
| --- | --- | --- |
| Mesh characteristic | 0.707 | 0.445 |
| This invention | 0.918 | 0.0122 |

Thus, the invention consistently provides a high matching score for similar images that does not depend on image location. The high degree of stability is shown by the fact that the standard deviation of the result is one-fortieth that obtained by the mesh characteristic method. Moreover, as the output value of one small region obtained using the local variation absorbing mask of this invention is unrelated to the outputs of other small regions, a parallel processor arrangement can be used, which would greatly increase the processing speed.

The invention has been described in detail with particular reference to certain preferred embodiments thereof, but it will be understood that variations and modifications can be effected within the spirit and scope of the invention.

What is claimed is:

1. A digital image processing method, comprising the steps of:
    (a) partitioning a multi-dimensional image comprising a plurality of image elements into overlapping multi-dimensional regions;
    (b) applying a predetermined weighting function to the image elements within each region for distinguishing image elements at the periphery of each region from image elements at the center of each region, to provide a weighted image element value for each image element; and
    (c) determining a characteristic output of each region from the weighted image element values, the characteristic output comprising one or more characteristics of the input image within that region.

2. A method according to claim 1, further comprising the step of:
    (d) comparing the characteristic outputs of the regions to a plurality of predetermined reference images such that the input image may be recognized notwithstanding local image variation.

3. A method according to claim 1 wherein the predetermined weighting function increases towards the center of each region and decreases towards the periphery of each region.

4. A method according to claim 1 wherein the predetermined weighting function is largest at the center of each region and is at a minimum at the periphery of each region.

5. A method according to claim 1 wherein the regions are hexagonal.

6. A method according to claim 1 wherein the characteristics of the input image within the region are chosen from intensity, curvature, and tangent angle.

7. A method according to claim 1 wherein the centers of the regions are uniformly spaced along each axis of the multi-dimensional input image.

8. A method according to claim 1 wherein the periphery of each region is tangent to the centers of each adjacent region.

9. A method according to claim 1 wherein said step of determining the characteristic output is simultaneously performed for all regions.

10. A method of image recognition, comprising the steps of:

(a) partitioning a multi-dimensional image, comprising a plurality of image elements, into overlapping multi-dimensional regions;

(b) applying a predetermined weighting function to the image elements within each region, the predetermined weighting function increasing towards the center of each region and decreasing towards the periphery of each region, to provide a weighted image element value for each image element;

(c) determining a characteristic output of each region from the weighted image element values, the characteristic output comprising one or more characteristics of the input image within that region; and (d) comparing the characteristic outputs of the regions to a plurality of predetermined reference images such that the input image may be recognized notwithstanding local image variation.

11. A method according to claim 10 wherein the characteristics of the input image within the region are chosen from intensity, curvature, and tangent angle.

12. A method according to claim 10 wherein the centers of the regions are uniformly spaced along each axis of the multi-dimensional input image.

13. A method according to claim 10 wherein the periphery of each region is tangent to the centers of each adjacent region.

14. A method according to claim 10 wherein said step of determining the characteristic output is simultaneously performed for all regions.

15. An apparatus for processing an image having a plurality of image elements, comprising:

(a) masking means for partitioning a multi-dimensional image into overlapping multi-dimensional regions;

(b) adjusting means, responsive to said masking means, for applying a predetermined weighting function to the image elements within each region, the predetermined weighting function increasing towards the center of each region and decreasing towards the periphery of each region, to provide a weighted image element value for each image element; and (c) computing means, responsive to said adjusting means, for determining a characteristic output of each region from the weighted image element values, the characteristic output comprising one or more characteristics of the input image within that region.

16. An apparatus according to claim 15 wherein said masking means partitions the multi-dimensional image into hexagonal regions.

17. An apparatus according to claim 15 wherein said computing means comprises means for summing the weighted image element values within each region to provide a characteristic output for each region.

18. An apparatus according to claim 15 wherein the characteristics of the input image within the region are chosen from intensity, curvature, and tangent angle.

19. An apparatus according to claim 15 wherein the centers of the regions are uniformly spaced along each axis of the multi-dimensional input image.

20. An apparatus according to claim 15 wherein the periphery of each region is tangent to the centers of each adjacent region.

21. An apparatus according to claim 15 wherein said computing means is a parallel processor for simultaneously determining the characteristic output of all the regions.

22. An apparatus for recognizing an image having a plurality of image elements, comprising:

(a) masking means for partitioning a multi-dimensional image into overlapping multi-dimensional regions;

(b) adjusting means, responsive to said masking means, for applying a predetermined weighting function to the image elements within each region, the predetermined weighting function increasing towards the center of each region and decreasing towards the periphery of each region, to provide a weighted image element value for each image element;

(c) computing means, responsive to said adjusting means, for determining a characteristic output of each region from the weighted image element values, the characteristic output comprising one or more characteristics of the input image within that region; and (d) identification means, responsive to said computing means, for comparing the characteristic outputs of the regions to a plurality of predetermined reference images such that the input image may be recognized notwithstanding local image variation.

23. An apparatus according to claim 22 wherein said computing means comprises means for summing the weighted image element values within each region to provide a characteristic output for each region.

24. An apparatus according to claim 22 wherein the centers of the regions are uniformly spaced along each axis of the multi-dimensional input image.

25. An apparatus according to claim 22 wherein said computing means is a parallel processor for simultaneously determining the characteristic output of all the regions.

26. An apparatus according to claim 22 wherein said identification means is a neutral network for comparing the characteristic outputs of the regions to a plurality of predetermined reference images.

* * * * *